United States Patent Office 2,720,469
Patented Oct. 11, 1955

2,720,469

PROCESS FOR PRODUCING FLUID-TIGHT CONCRETE

Wilhelm Serkin, Armadale, Melbourne, Victoria, Australia, assignor to Rocla Pipes Limited, Melbourne, Victoria, Australia, a company of Victoria No Drawing. Application May 28, 1952,
Serial No. 290,554

Claims priority, application Australia June 29, 1951

4 Claims. (Cl. 117—54)

This invention relates to the production of concrete which is fluid-tight or at least highly resistant to the passage of fluids through it. Concrete is a heterogeneous material, and hence is not impermeable. Gases pass through it readily even at slight pressures, and it is not, under all circumstances, impermeable to pressure water. Furthermore, by reason of shrinkage and other stresses, concrete in some conditions develops fine cracks that permit the passage of fluids through it. The term "concrete" is used herein to include, in addition to normal concrete, calcareous cement mortar and mixtures of cement and asbestos.

The object of this invention is to provide a simple and relatively cheap method of conferring upon a concrete article or structure the property of resisting the passage through it of fluids—for example, gases and water.

According to this invention concrete is made fluid-tight (i. e. is made more resistant to the passage of a fluid through its structure) by forming a film or membrane upon or in the concrete by the chemical reaction of an organic colloidal solution with the calcareous cement of the concrete, and/or with an added solution of one or more metal salts (such as those of calcium, chromium or zinc, for example). The colloidal solution used must be one which will react in the manner above-described. Obviously, the film so formed must be of such a nature that it will not be affected adversely by the liquid or gas whose passage through the concrete it is desired to retard; for example, in the case of a water pipe the film must be insoluble in water. A film or membrane which will resist the passage through it of the fluid in question and which will not be affected adversely by the fluid is termed hereinafter a "fluid-resistant film."

While the invention extends broadly to the use of any colloid which will effect the desired reaction, it resides primarily in applying to the concrete surface an aqueous solution of water-soluble salt of alginic acid (e. g. sodium or ammonium alginate). The alginate reacts rapidly with the soluble calcium compounds of the cement to produce a water-insoluble film of calcium alginate or like compound. Even a small percentage of alginate (as, for example, a solution of about 5%) has been found to produce a continuous film.

Obviously, the film is unsuitable for resisting the passage of an alkaline or other fluid which would chemically attack the film.

The qualities of the film can be modified and for certain purposes improved by the admixture of rubber latex or bitumen-bentonite emulsions, or even small amounts of oily substances, with the alginate solution. For example, if the film were to be subjected to extensive drying it might tend to become rather brittle. This can be mitigated by the above-mentioned modification of the film.

If desired, the concrete surface may first be treated with a solution of one or more metal salts (such as calcium, chromium, or zinc salts, for example). When an alginate solution contacts a surface so treated, a film forms by reaction with the metal salt or salts and rapidly builds up to a thickness and texture which render it watertight and gas-tight or at least very fluid-resisting. As such films are capable of some extension without breaking, they are capable of remaining fluid-resisting even when the adjacent concrete suffers fine cracks.

It is desirable in most cases to protect the film from mechanical injury, weathering and the like. Thus it may be covered, for example, by a protective layer of concrete.

By way of example, suitable procedure for building a concrete wall is as follows: First, the main body of the concrete wall is constructed as normally. Then the mould is stripped away and the face of the wall (on the side to face the fluid which it is to resist) is sprayed or painted with a mixture comprising 50 parts of a 5% solution of sodium alginate, and 50 parts of rubber latex. This treatment produces a continuous rather ductile water-insoluble film. After this film has been so formed, and preferably as soon as possible, a protective layer, of ½" or more thickness, of cement mortar is placed over it by known means. The resulting body is a concrete wall, having within it a continuous film which will prevent, or at least very greatly reduce, the passage of fluids through the wall, excepting those which chemically attack the film.

The invention may be applied to concrete tanks, pipes and the like, and is especially useful in concrete structures which serve the purposes of containers or conduits for fluids.

I claim:

1. A method of treating formed concrete structures to render them resistant to the passage of gases and liquids therethrough, comprising applying to a formed concrete surface an aqueous solution of an alginate selected from the group consisting of sodium and ammonium alginates, and allowing said applied alginate to react with calcium present in the surface layers of the concrete to form a substantially continuous water-insoluble layer of calcium alginate on said surface.

2. A method of treating formed concrete structures to render them resistant to the passage of gases and liquids therethrough, comprising applying to a formed concrete surface an aqueous solution of a salt selected from the group of water-soluble salts of calcium, chromium and zinc, thereafter applying to said so-treated surface an aqueous solution of an alginate selected from the group consisting of sodium and ammonium alginates, and allowing said applied alginate to react with said applied metal salt to form a substantially continuous water-insoluble metal alginate layer on said surface.

3. A method of treating formed concrete structures to render them resistant to the passage of gases and liquids therethrough, as claimed in claim 1, which further comprises overcoating said layer of calcium alginate with a layer of concrete.

4. A method of treating formed concrete structures to render them resistant to the passage of gases and liquids therethrough, as claimed in claim 2, which further comprises overcoating said layer of insoluble metal alginate with a layer of concrete.

References Cited in the file of this patent

UNITED STATES PATENTS

| Number | Name | Date |
|---|---|---|
| 1,415,324 | Erdahl | May 9, 1922 |
| 1,415,849 | Erdahl | May 9, 1922 |
| 1,671,995 | Nelson | June 5, 1928 |
| 2,013,651 | Erdahl | Sept. 10, 1935 |
| 2,307,696 | Blair-McGuffie | Jan. 5, 1943 |
| 2,432,688 | Slack | Dec. 16, 1947 |